United States Patent
Tanaka

(10) Patent No.: US 8,541,998 B2
(45) Date of Patent: Sep. 24, 2013

(54) SWITCHING CONVERTER CIRCUIT

(75) Inventor: Shunsei Tanaka, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 223 days.

(21) Appl. No.: 13/211,523

(22) Filed: Aug. 17, 2011

(65) Prior Publication Data

US 2012/0049814 A1 Mar. 1, 2012

(30) Foreign Application Priority Data

Aug. 25, 2010 (JP) ................................. 2010-188593

(51) Int. Cl.
*G05F 1/00* (2006.01)

(52) U.S. Cl.
USPC ........................................................ 323/283

(58) Field of Classification Search
USPC .................. 323/225, 271, 282, 283, 285, 351
See application file for complete search history.

(56) References Cited

U.S. PATENT DOCUMENTS

| | | | |
|---|---|---|---|
| 7,183,755 B2 | 2/2007 | Itoh et al. | |
| 7,408,331 B2 | 8/2008 | Tanaka | |
| 7,477,048 B2 * | 1/2009 | Nakatani | 323/285 |
| 7,479,773 B2 | 1/2009 | Michishita | |
| 7,498,694 B2 * | 3/2009 | Luo et al. | 307/82 |
| 7,538,526 B2 | 5/2009 | Kojima et al. | |
| 7,548,044 B2 | 6/2009 | Itoh et al. | |
| 7,782,034 B2 | 8/2010 | Tanaka | |
| 7,795,849 B2 | 9/2010 | Sohma | |
| 7,893,752 B2 | 2/2011 | Tanaka | |
| 8,058,855 B2 * | 11/2011 | Cheng | 323/271 |
| 2009/0180231 A1 | 7/2009 | Tanaka | |
| 2010/0045255 A1* | 2/2010 | Chojecki et al. | 323/284 |
| 2010/0156368 A1* | 6/2010 | Huynh et al. | 323/282 |

FOREIGN PATENT DOCUMENTS

| | | |
|---|---|---|
| JP | 2006-309569 | 11/2006 |
| JP | 2006-338156 | 12/2006 |
| JP | 2007-143368 | 6/2007 |
| JP | 2008-67495 | 3/2008 |
| JP | 2008-92635 | 4/2008 |
| JP | 2009-11121 | 1/2009 |
| JP | 2009-169503 | 7/2009 |

* cited by examiner

*Primary Examiner* — Timothy J Dole
*Assistant Examiner* — Afework Demisse
(74) *Attorney, Agent, or Firm* — Cooper & Dunham LLP

(57) ABSTRACT

A switching converter circuit utilized for converting voltages applied to a first input terminal and a second input terminal into constant voltages to output the constant voltages to a load includes a first switching unit connected between the first and the second input terminals, a second switching unit cascade connected with a third switching unit between the second input terminal and an output terminal, a fourth switching unit connected in parallel with the second and the third switching units, a first comparator to control switching on or off of the third switching unit, a second comparator to control switching on or off of the fourth switching unit, and a controller to control a time to allow the first comparator to output an output signal such that the fourth switching unit is switched off before the third switch is switched off based on the signal output from the first comparator.

3 Claims, 4 Drawing Sheets

SWITCHING CONVERTER CIRCUIT

BACKGROUND OF THE INVENTION

1. Field of the Invention

The disclosures herein relate to a switching converter circuit configured to output a predetermined constant voltage by a switching operation.

2. Description of the Related Art

Initially, a related art switching converter circuit is described. FIG. 1 is a diagram illustrating the related art switching converter circuit.

As illustrated in FIG. 1, a switching circuit converter circuit 10 includes input terminals Vin1 and Vin2, switches SW1, SW2 and SW3, a backflow preventer circuit 1, and an inverter 2. The switch SW1 supplies electric charges to a coil via the input terminal Vin1 when the switch SW1 is in ON-cycle. The switch SW2 supplies electric charges to the coil via the input terminal Vin2 when the switching converter circuit 10 is OFF-cycle. The switch SW3 is cascade connected to the switch SW2.

ON/OFF of the switch SW1 is controlled by a control signal S1 supplied from a terminal T1, and ON/OFF of the switch SW2 is controlled by an inverted signal obtained by the inverter 2 inverting the control signal S1. ON/OFF of the switch SW3 is controlled by an output signal supplied from the backflow preventer circuit 1.

In the related art switching converter circuit 10, the backflow preventer circuit 1 corresponds to a comparator, and the switch SW3 is controlled by the output signal supplied from the comparator. Further, the backflow preventer circuit (comparator) 1 is configured to detect a voltage between the input terminals Vin 1 and Vin2, a voltage between both ends of the switch SW2, or a voltage between both ends of the switch SW3 so as to detect the backflow of the electric current based on the detected voltage. Japanese Patent Application Publication No. 2008-67495 discloses a switching regulator, an example of which is illustrated as the switching circuit converter circuit 10 in FIG. 1.

However, when the voltage of the backflow preventer circuit actually produced is measured, the measured voltage may be varied. As a result, the current actually operating the backflow preventer circuit may be varied.

For example, a preferable characteristic that may be required for the switching converter circuit utilized in devices such as mobile phones may be efficiency. In order to improve the efficiency of the switching converter circuit in a light loaded mode, the generation of the backflow current may need to be prevented when the switching converter circuit is OFF-cycle. However, it may be difficult to design the switching converter circuit having the above configuration to reduce the backflow current approximately to 0 in order to improve the accuracy of the backflow preventer circuit.

SUMMARY OF THE INVENTION

It is a general object of at least one embodiment of the present invention to provide a switching converter circuit having a backflow preventer circuit with improved accuracy that substantially eliminates one or more problems caused by the limitations and disadvantages of the related art.

According to an embodiment, there is provided a switching converter circuit having a first input terminal, a second input terminal and an output terminal, and utilized for converting voltages applied to the first input terminal and the second input terminal into constant voltages to output the constant voltages to a load. The switching converter circuit includes a first switching unit connected between the first input terminal and the second input terminal; a second switching unit and a third switching unit configured to be cascade connected with each other between the second input terminal and the output terminal; a fourth switching unit connected in parallel with the second switching unit and the third switching unit; a first comparator configured to control switching on or off of the third switching unit; a second comparator configured to control switching on or off of the fourth switching unit; and a controller configured to control a time to allow the first comparator to output an output signal such that the fourth switching unit is switched off before the third switch is switched off based on the signal output from the first comparator.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS (First Embodiment)

Preferred embodiments of the invention will be described below with reference to the accompanying drawings.

Figure 1:
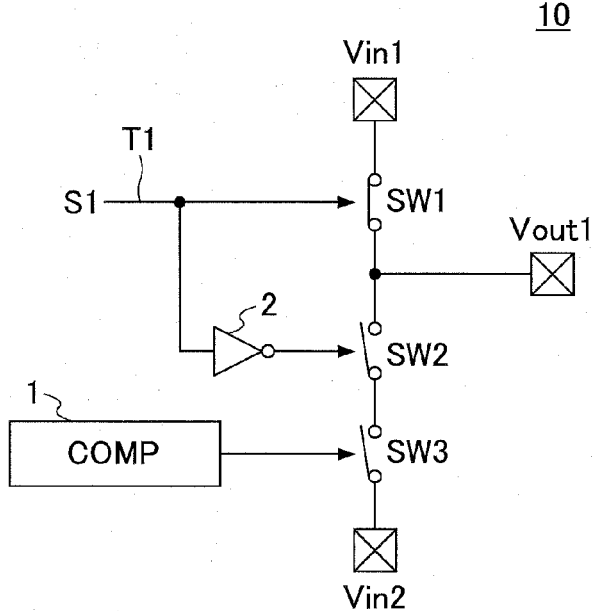
FIG. 1 a diagram illustrating a related art switching converter circuit.
Figure 2:
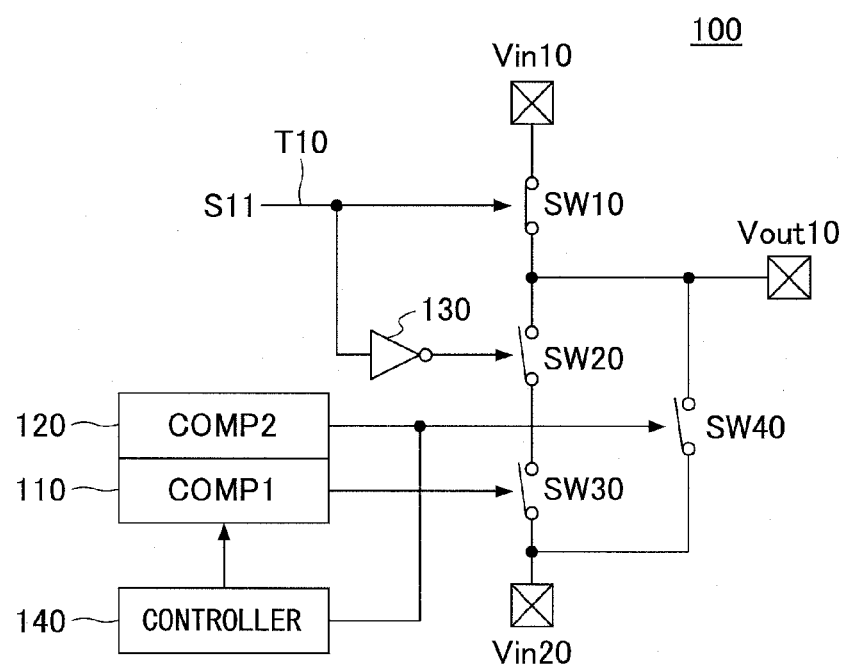
FIG. 2 is a diagram illustrating a switching converter circuit according to a first embodiment.

FIG. 2 is a diagram illustrating a switching converter circuit 100 according to a first embodiment. The switching converter circuit 100 according to the first embodiment includes comparators 110 and 120, an inverter 130, a controller 140, switches SW10, SW20, SW30 and SW40, input terminals Vin10 and Vin20, an output terminal 10, and a control terminal T10. The comparators 110 and 120 serve as a backflow preventer circuit.

The switch SW10 supplies electric charges to a not-illustrated coil via the input terminal Vin10 when the switching converter circuit 100 is ON-cycle The switch SW20 supplies electric charges to the not-illustrated coil via the input terminal Vin20 when the switching converter circuit 100 is OFF-cycle. The switch SW30 is cascade connected to the switch SW20.

ON/OFF of the switch SW10 is controlled by a control signal S11 supplied from the control terminal T10, and ON/OFF of the switch SW20 is controlled by an inverted signal obtained by the inverter 130 inverting the control signal S11. ON/OFF of the switch SW30 is controlled by a signal output from the comparator 110.

The switch SW40 is connected in parallel with the switches SW20 and SW 30 that are cascade connected with each other, and ON/OFF of the switch SW40 is controlled by an output signal supplied from the comparator 120.

The voltage of the input terminal Vin20 and the voltage of the output terminal Vout10 are applied to an inverter input terminal and a non-inverter input terminal, respectively, of each of the comparators 110 and 120.

In the switching converter circuit 100 according to the first embodiment, the comparator 110 detects, for example, the voltage between the input terminal Vin20 and the output terminal Vout10 to detect the backflow of the current (backflow current).

The comparator 110, for example, switches the switch SW30 on to be in a conductive state when the voltage between the input terminal Vin20 and the output terminal Vout10 is lower than the ground potential, that is, when there is no possibility of the backflow current generation. Or, the comparator 110, for example, switches the switch SW30 off to be in a nonconductive state to cut off the backflow current when the voltage between the input terminal Vin20 and the output terminal Vout10 is the ground potential or above, that is, when there is a possibility of the backflow current generation.

The controller 140 controls the comparator 110 to output a signal after the output signal of the comparator 120 is inverted. In the switching converter circuit 100 according to the first embodiment, the controller 140 is supplied with the output signal of the comparator 120, such that the controller 140 controls a time to allow the comparator 110 to output a signal such that the signal output from the comparator 110 is supplied to the switch SW30 when the output signal of the comparator 120 is inverted.

In the switching converter circuit 100 according to the first embodiment, the controller 140 is configured to control the switch SW40 to be switched off before the comparator 110 detects the backflow current, that is, before the switch SW30 is switched off.

In the switching converter circuit 100 according to the first embodiment, ON-resistance of the switches arranged between the input terminal Vin20 and the output terminal Vout10 is raised by controlling ON/OFF of the switch SW40 in this manner.

Figure 3A:
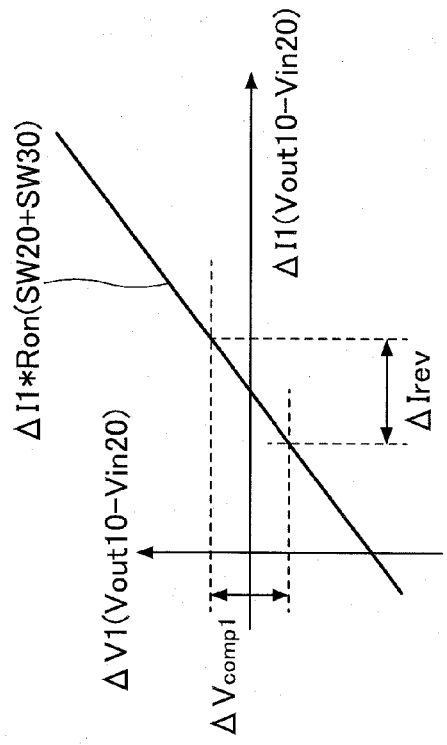
FIGS. 3A and 3B are diagrams illustrating examples of operational waveforms of comparators provided in the switching converter circuit according to the first embodiment.
Figure 3B:
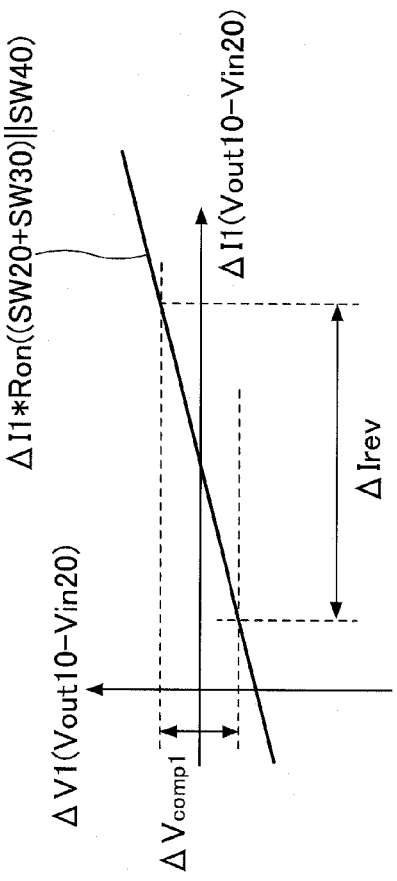

FIGS. 3A and 3B are diagrams illustrating examples of the operational waveforms of the comparators 110 and 120 provided in the switching converter circuit according to the first embodiment. FIG. 3A illustrates a state when the switch SW40 is switched on (ON-state), and FIG. 3B illustrates a state when the switch SW40 is switched off (OFF-state).

In FIG. 3A and 3B, $\Delta Vcomp1$ represents the variation in the voltage detected by the comparator 110, $\Delta I1$ represents the current between the input terminal Vin20 and the output terminal Vout10, and $\Delta Irev$ represents the variation in the backflow current detected by the comparator 110.

As illustrated in FIGS. 3A and 3B, if the accuracy of the comparator 110 is the same in both cases (ON-state and OFF state), the variation in the detected backflow current may be smaller under the larger ON-resistance of the switches between the input terminal Vin20 and the output terminal Vout10. Note that the accuracy of the comparator 110 may be represented by the variation in the detected voltage $\Delta Vcomp1$. The $\Delta Vcomp1$ in FIG. 3A and $\Delta Vcomp1$ in FIG. 3B have the same value.

In the switching converter circuit 100 according to the first embodiment, since the variation in the backflow current may be reduced by the comparator 110 serving as the backflow preventer circuit, the accuracy of the backflow preventer circuit may be improved.

[Second Embodiment]

Next, the switching converter circuit 100A according to a second embodiment is described with reference to the accompanying drawings. The difference between the switching converter circuit 100 according to the first embodiment and the switching converter circuit 100A according to the second embodiment is voltages detected by the comparators 110 and 120. Accordingly, in the second embodiment, the difference between the first and second embodiments is described, and functional components of the second embodiment similar to those of the first embodiment are provided with the same reference numerals and are not described again.

Figure 4:
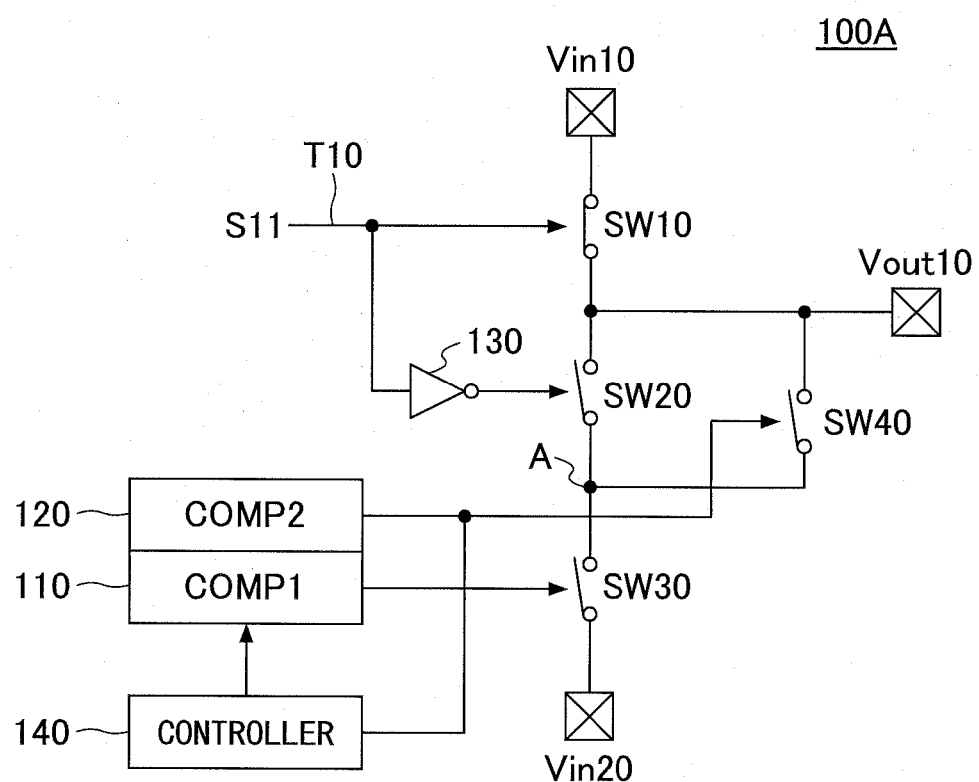
FIG. 4 is a diagram illustrating a switching converter circuit according to a second embodiment.

FIG. 4 is a diagram illustrating the switching converter circuit 100A according to the second embodiment. In the switching converter circuit 100A according to the second embodiment, the switch SW40 is connected in parallel with the switch SW20, and the comparators 110 and 120 are configured to compare the voltage of the output terminal Vout10 and the voltage of a node A between the switches SW20 and SW30.

In the switching converter circuit 100 according to the first embodiment, the controller 140 controls a time to allow the comparator 110 to output a signal such that the signal output from the comparator 110 is supplied to the switch SW30 when the output signal of the comparator 120 is inverted.

Figure 5:
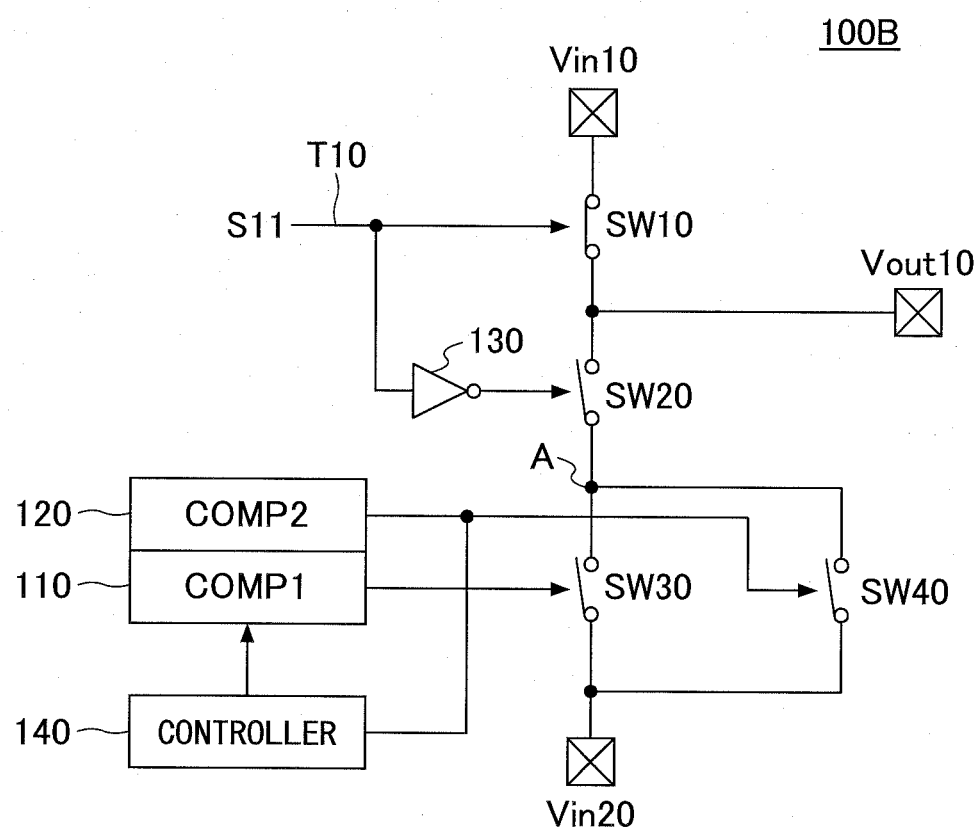
FIG. 5 is a diagram illustrating a modified switching converter circuit according to the second embodiment.

FIG. 5 is a diagram illustrating a modified switching converter circuit 100B according to the second embodiment. In the modified switching converter circuit 100B according to the second embodiment, the switch SW40 is connected in parallel with the switch SW30, and the comparators 110 and 120 are configured to compare the voltage of the input terminal Vin20 and the voltage of the node A between the switches SW20 and SW30. The functional configuration of the controller 140 illustrated in FIG. 5 is the same as described above with reference to FIG. 4.

In the modified switching converter circuit 100B according to the second embodiment, since the variation in the backflow current may be reduced by the comparator 110 serving as the backflow preventer circuit, the accuracy of the backflow preventer circuit may be improved.

Embodiments have been described heretofore for the purpose of illustration; however, the present invention is not limited to these embodiments and modification. Various variations and modifications may be made without departing from the scope of the present invention.

According to an embodiment, there is provided a switching converter circuit having a first input terminal, a second input terminal and an output terminal, and utilized for converting voltages applied to the first input terminal and the second input terminal into constant voltages to output the constant voltages to a load. The switching converter circuit includes a first switching unit connected between the first input terminal and the second input terminal; a second switching unit and a third switching unit configured to be cascade connected with each other between the second input terminal and the output terminal; a fourth switching unit connected in parallel with the second switching unit and the third switching unit; a first comparator configured to control switching on or off of the third switching unit; a second comparator configured to control switching on or off of the fourth switching unit; and a controller configured to control a time to allow the first comparator to output an output signal such that the fourth switching unit is switched off before the third switch is switched off based on the signal output from the first comparator.

In the switching converter circuit, the fourth switching unit is connected in parallel with the second switching unit.

In the switching converter circuit, the fourth switching unit is connected in parallel with the third switching unit.

According to the above-described embodiments and the modification, the accuracy of the backflow preventer circuit may be improved.

Further, the present invention is not limited to these embodiments, but various variations and modifications may be made without departing from the scope of the present invention.

The present application is based on Japanese priority application No. 2010-188593 filed on Aug. 25, 2010, with the Japanese Patent Office, the entire contents of which are hereby incorporated by reference.

What is claimed is:

1. A switching converter circuit having a first input terminal, a second input terminal and an output terminal, and utilized for converting voltages applied to the first input terminal and the second input terminal into constant voltages to output the constant voltages to a load, the switching converter circuit comprising:
   a first switching unit connected between the first input terminal and the second input terminal;
   a second switching unit and a third switching unit configured to be cascade connected with each other between the second input terminal and the output terminal;
   a fourth switching unit connected in parallel with the second switching unit and the third switching unit;
   a first comparator configured to control switching on or off of the third switching unit;
   a second comparator configured to control switching on or off of the fourth switching unit; and
   a controller configured to control a time to allow the first comparator to output an output signal such that the fourth switching unit is switched off before the third switch is switched off based on the signal output from the first comparator.

2. The switching converter circuit as claimed in claim 1, wherein
   the fourth switching unit is connected in parallel with the second switching unit.

3. The switching converter circuit as claimed in claim 1, wherein
   the fourth switching unit is connected in parallel with the third switching unit.

\* \* \* \* \*